United States Patent
Wu et al.

(10) Patent No.: US 8,391,431 B2
(45) Date of Patent: *Mar. 5, 2013

(54) APPARATUS, AND ASSOCIATED METHOD, FOR FILTERING A RECEIVE SIGNAL BY ADAPTIVE OPERATION OF AN INPUT NOISE WHITENING FILTER

(75) Inventors: Huan Wu, Ottawa (CA); Sean Simmons, Waterloo (CA)

(73) Assignee: Research In Motion Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/368,512

(22) Filed: Feb. 8, 2012

(65) Prior Publication Data

US 2012/0134454 A1 May 31, 2012

Related U.S. Application Data

(63) Continuation of application No. 11/673,045, filed on Feb. 9, 2007, now Pat. No. 8,126,099.

(51) Int. Cl.
*H04B 1/10* (2006.01)
(52) U.S. Cl. ........ 375/350; 375/229; 375/230; 375/231; 375/232; 375/346; 375/348; 455/296
(58) Field of Classification Search .................. 375/232, 375/346, 347, 350; 455/67.13, 296
See application file for complete search history.

(56) References Cited

U.S. PATENT DOCUMENTS

| | | | |
|---|---|---|---|
| 2003/0048840 A1* | 3/2003 | Ling et al. | 375/232 |
| 2004/0266383 A1 | 12/2004 | Mattellini et al. | |
| 2005/0031061 A1* | 2/2005 | Ojard et al. | 375/346 |
| 2005/0079826 A1* | 4/2005 | He | 455/67.13 |
| 2005/0227663 A1* | 10/2005 | He | 455/296 |
| 2005/0250466 A1* | 11/2005 | Varma et al. | 455/296 |

FOREIGN PATENT DOCUMENTS

| | | |
|---|---|---|
| FR | 2873877 A1 | 2/2006 |
| WO | 01/39448 A1 | 5/2001 |
| WO | 2005/002241 A2 | 1/2005 |
| WO | 2005/041510 A1 | 5/2005 |
| WO | 2005/048548 A2 | 5/2005 |

* cited by examiner

*Primary Examiner* — Daniel Washburn
*Assistant Examiner* — Eboni Hughes

(57) ABSTRACT

Apparatus, and an associated method, for the receive part of a receiving station, such as a mobile station or other transceiver of a cellular communication system. Selection is made of filter characteristics to be exhibited by an adaptive, input noise whitening filter. A noise estimator estimates a noise component of a noise sequence. An autocorrelation estimator estimates the noise-component autocorrelation. A determination is made as to whether the autocorrelation exceeds a threshold. If so, filter characteristics are selected to cause the input noise whitening filter to operate to inject whitening noise into the received sequence.

16 Claims, 3 Drawing Sheets

APPARATUS, AND ASSOCIATED METHOD, FOR FILTERING A RECEIVE SIGNAL BY ADAPTIVE OPERATION OF AN INPUT NOISE WHITENING FILTER

CROSS REFERENCE TO RELATED APPLICATION

The present application is a continuation application of co-pending U.S. patent application Ser. No. 11/673,045, filed on Feb. 9, 2007. The prior application is hereby incorporated into the present application by reference.

The present invention relates generally to a manner for a receiving station, such as the receive part of a cellular-system transceiver, by which to suppress interference included in a receive signal. More particularly, the present invention relates to apparatus, and an associated method, by which to operate an adaptive input noise whitening filter of the receiving station. The filter is caused to be powered, or otherwise operated, to whiten interference when the receive signal contains a significant interference component and otherwise not to inject whitening.

A threshold is used to select whether to operate the input noise whitening filter. Through appropriate setting of the threshold, the filter is caused to be operable when the whitening facilitates information recovery of received data and to be operable not to inject whitening when its injection is not needed or helpful to the information recovery.

BACKGROUND OF THE INVENTION

Digital cellular, and other radio, communication systems are deployed to encompass significant portions of the populated areas of the world. For many, access to such a communication system is a practical necessity. Two-way communications are generally provided in a cellular communication system to effectuate both voice communication services and data communication services.

A cellular communication system makes relatively efficient use of its allocated bandwidth, i.e., the portion of the electromagnetic spectrum allocated to the communication system for communications between the network infrastructure and a mobile station used pursuant to effectuation of a communication service. The geographical area encompassed by the cellular communication system is divided into parts referred to as cells, each defined by a base transceiver station. Relatively low-power signals are generated to effectuate communications between a base transceiver station and a mobile station positioned within the associated cell. And, cell-reuse schemes are utilized in which the same channels are re-used in different ones of the cells according to a cell re-use pattern or scheme. While channel allocations made pursuant to a cell re-use scheme are made to limit interference between concurrently-generated signals in the different cells, interference, sometimes occurs. Interference includes both co-channel interference and adjacent channel interference. If the interference is significant and it is not suppressed, or otherwise compensated for, the interference degrades communication performance of the receiving station.

Co-channel interference refers to interference caused by concurrently-generated signals sent in another cell that uses, i.e., "re-uses", the same channels as those channels used in the cell in which the interfering signals are detected. And adjacent-channel interference refers to interference caused by concurrently-generated signal sent, typically, in another, e.g., adjacent, cell that uses different channels. But, the signal strengths of the signals sent in such other cells is so great as to cause aliasing that results in interference.

Various mechanisms are used, and others proposed, by which to compensate for interference included in a receive signal received at a receiving station. For instance, use of an adaptive noise whitening filter (INWF) has been proposed to suppress interference. The INWF is used together with a receive filter. The receiver filter has a passband wide enough to pass some adjacent channel interference and the INWF operates to whiten the interference. While a narrow receiver filter would reject greater amounts of adjacent channel interference, its narrowing worsens equalizer operation at the receiving station to compensate for co-channel interference.

In short, the use of the adaptive input noise whitening filter in a manner best to suppress adjacent channel interference competes with the ability of other receive-station elements to suppress, or compensate for co-channel interference. There is a need therefore, to provide an improved manner, at a receiving station, to compensate for, or to suppress, interference forming part of a receive signal received at a receiving station.

It is in light of this background information related to receiving stations operable in a radio, or other, communication system that the significant improvements of the present invention have evolved.

DETAILED DESCRIPTION

Figure 1:
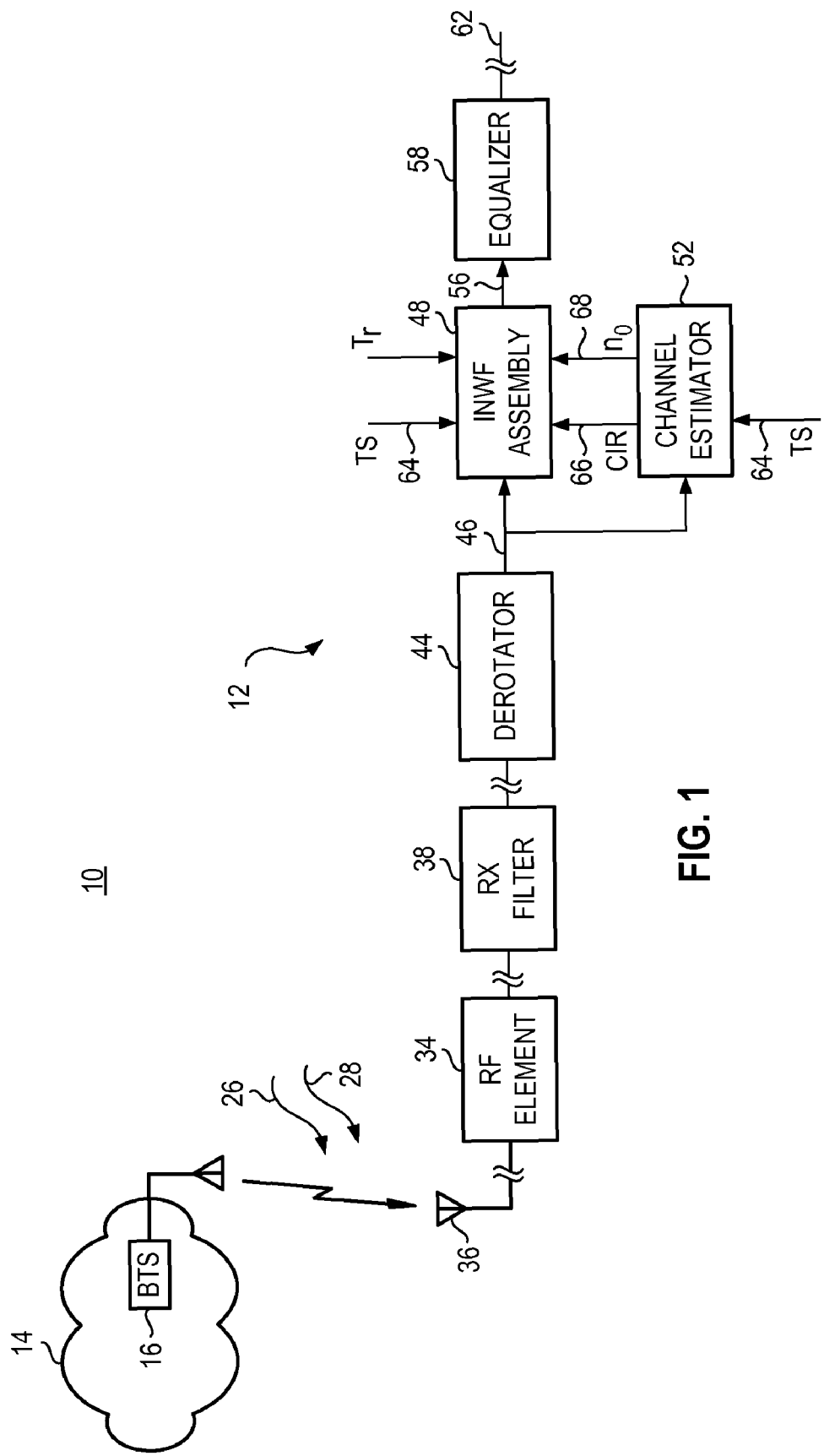
FIG. 1 illustrates a functional block diagram of a radio communication system in which an embodiment of the present invention is operable.

The present invention, accordingly, advantageously provides apparatus, and an associated method, for a receiving station, such as the receive part of a cellular-system transceiver, by which to compensate for interference included in a receive signal received at the receiving station.

Through operation of an embodiment of the present invention, an input noise whitening filter assembly is provided to facilitate information recovery at the receiving station.

Through further operation of an embodiment of the present invention, a manner is provided by which to operate the adaptive, input noise whitening filter (INWF) of the receiving station.

In one aspect of the present invention, the adaptive, input noise whitening filter is caused to be operated when interference forms a significant part of the receive signal. And, the filter is caused not to be powered, or otherwise not to inject whitening noise when the level of adjacent-channel or co-channel interference is relatively low.

In another aspect of the present invention, a receive sequence is detected at a receiving station. A noise estimator estimates the noise component of the receive sequence. The noise component estimate is formed, e.g., utilizing a channel impulse response and a known training sequence.

In another aspect of the present invention, an autocorrelation estimate is formed of the estimated noise component. A high estimate of autocorrelation is indicative of a significant noise component of the receive signal. And, conversely, an estimate of autocorrelation that is of a low value is indicative of a receive signal having a small, or negligible, noise component.

In another aspect of the present invention, an autocorrelation estimate is provided to a filter characteristic selector. The filter characteristic selector compares the autocorrelation estimate with a threshold value. Responsive to the comparison, selection is made as to the filter characteristics to be exhibited by a filter positioned in-line to receive a representative of the receive sequence. The filter characteristic selector selects filter characteristics to be exhibited by a filter if the autocorrelation estimate exceeds the threshold. Otherwise, no filter characteristics, i.e., a no-filtering characteristic, is selected by the filter characteristic selector.

Characteristics selected by the filter characteristic selector cause, for instance, the filter characteristic to be of a Linear Prediction Error Filter (LPF).

In another aspect of the present invention, an adaptive, input noise whitening filter is provided that selectably causes noise whitening or to be of characteristics that do not cause noise whitening of a receive sequence applied thereto. That is to say, the filter is adaptively of characteristics that whiten input interference plus noise and, alternately, not to whiten a receive sequence.

In another aspect of the present invention, the adaptive, input noise whitening filter that, when operated in a manner to exhibit other-than-unitary filtering characteristics, flattens the spectrum of a received sequence signal. When the received sequence signal does not exhibit a significant noise, either adjacent-channel or co-channel, component, whitening filter operation is not required to flatten the spectrum of the received sequence signal. And, the input noise whitening filter is not operative to provide the whitening filtering of the input signal.

In another aspect of the present invention, the receive chain of the receive part of a receiving station includes a receiver filter positioned in-line with an adaptive, input noise whitening filter, and the filters together are positioned in-line with an equalizer element. The use of the adaptive, input noise whitening filter permits the receiver filter to be of a wider-bandwidth pass band than would otherwise be permitted. While the receiver filter passes greater amounts of adjacent-channel interference, if the interference is significant, the INWF is caused to be operable to whiten the signal, thereby to suppress the adjacent interference by whitening the input interference plus noise. Such operation facilitates equalizer operation by which to recover informational content of a received sequence received at the receive chain portion.

In these and other aspects, therefore, apparatus, and an associated method, is provided for a receive circuit that receives a receive sequence. A noise-component characteristic determiner is adapted to receive an indication of a noise component of the receive sequence. The noise component characteristic determiner is configured to determine a noise-component characteristic that is characteristic of the noise component. A filter characteristic selector is adapted to receive an indication of the noise-component characteristic determined by the noise-component characteristic determiner. The filter characteristic selector is configured to select a filter characteristic responsive to the noise-component characteristic.

Referring first, therefore, to FIG. 1, a radio communication system, shown generally at 10, provides for communications with mobile stations, such as the mobile station 12. In the exemplary implementation, the communication system 10 forms a cellular communication system, a multi-access mobile radio communication system, having a network infrastructure including a plurality of spaced-apart space stations. Here, the network infrastructure is represented at 14, and a single base transceiver station (BTS) 16 is represented to be part of the network infrastructure. More generally, the communication system 10 is representative of any of various communication systems formed of a set of communications stations, here the stations 12 and 16, in which a communicated signal is susceptible to having distortion introduced thereon. Additionally, the following description of exemplary operation shall be described with respect to downlink communications, that is, communication of data from the base transceiver station to the mobile station 12. Description of operation of data communicated in the opposite, i.e., uplink, direction is analogous. Accordingly, the following description is merely exemplary. Embodiments of the present invention are analogously implementable in any of various radio, and other, communication systems.

The arrow 24 is representative of the communication of data, here a sequence of data symbols, by the base transceiver station to the mobile station 12. Arrows 26 and 28 are representative, respectively, of adjacent channel interference and co-channel interference introduced upon the data during its communication to the mobile station. The data sequence, when received at the mobile station, herein referred to, at times, as a receive sequence, includes component portions formed of the data sequence, the adjacent channel interference, and the co-channel interference. The adjacent-channel and co-channel interference form, collectively, the interference component. As noted previously, the interference component interferes with the recovery of the informational content of the communicated data sequence. Efforts are made to suppress, or compensate for, the interference included in the receive sequence.

The receive part, i.e., the receive chain, of the mobile station is shown in FIG. 1. The receive part includes a RF (Radio Frequency) element 34 that operates upon indications of the receive sequence, once transduced into electrical form by the antenna 36. The RF element is further representative, e.g., of down conversion circuitry that down-converts radio-frequency energy to base band levels. The receive chain further includes a receiver filter 38, a wide-band, bandwidth filter that suppresses component portions of the received signal that are beyond the pass band of the filter. The filter, while shown as a single element, is formed of, e.g., a combination of analog and digital filters that together define the task band of the filter element 38.

Signal passed by the receiver filter 38, here including I/Q samples on the line 42, are provided to a derotation element 44. Derotation operations are performed by the derotator, and derotated values, x(n), are generated on the line 46. The line 46 extends to an adaptive input noise whitening filter, INWF assembly 48 of an embodiment of the present invention and to a channel estimator 52.

In general, the INWF assembly operates selectably, depending upon the interference component of the receive sequence, to add whitening noise to the signal applied thereto. Operation of the INWF shall be described in greater detail below. And, a filter output signal is generated on the line 56 that extends to an equalizer, such as a GMSK (Gaussian Minimum Shift Keying) equalizer, 58. Soft decisions of symbol values are made by the equalizer. Values representative of the decided values are generated on the line 62 and provided to other receive chain elements (not shown).

The channel estimator 52 forms a channel estimate, a channel impulse response (CIR) responsive to the input values provided on the line 46 and also training sequence (TS) provided on the line 64. A channel impulse response value and a timing offset value, $n_0$, are provided to the INWF assembly, here represented by way of the lines 66 and 68, respectively.

In operation, the INWF assembly is operable to provide signal whitening that acts to suppress adjacent channel interference by whitening the input interference and noise. The whitening is provided only when the received sequence is of characteristics that such addition is helpful. When there are low levels of interference, the INWF is caused not to provide whitening, such as being switched-off or turned-off, thereby acting as a unitary filter that passes all components of the signal applied to the filter.

Figure 2:
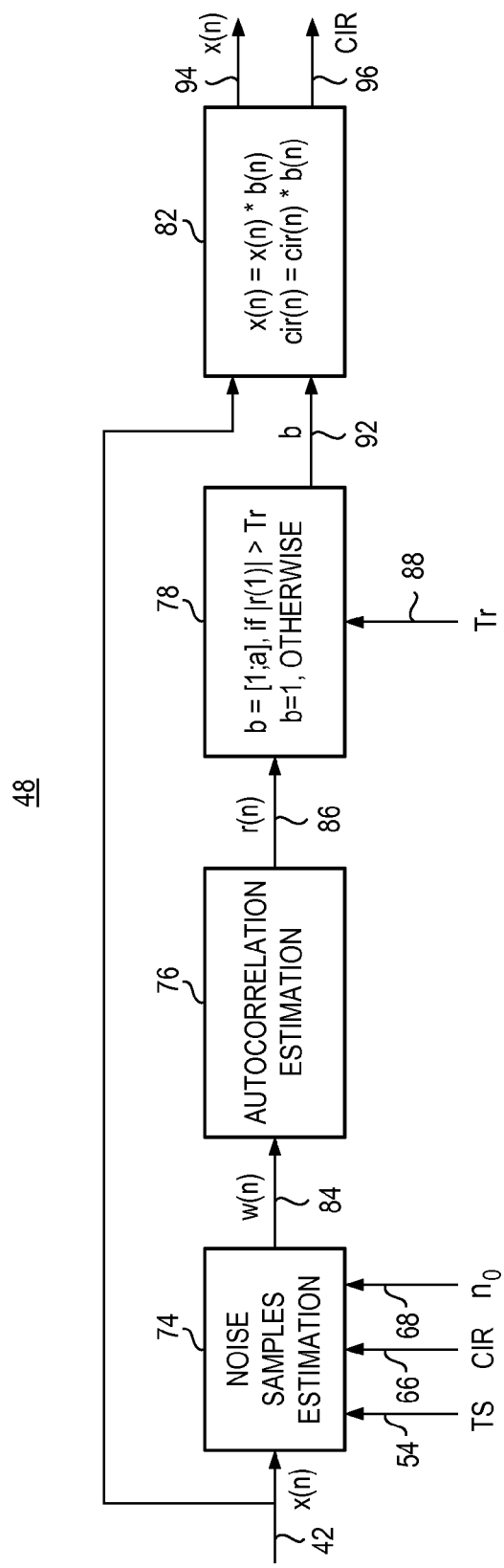
FIG. 2 illustrates a functional block diagram of an adaptive, input noise whitening filter assembly of an embodiment of the present invention.

FIG. 2 illustrates the INWF assembly 48 that forms part of the receive part of the mobile station 12 shown in FIG. 1. The sampled values x(n) are again shown to be provided to the assembly on the line 42. The assembly is here shown to include a noise sample estimation element 74, an autocorrelation estimation element 76, a filter characteristic selector 78, and a filter element 82. The elements of the INWF assembly are functionally represented, implementable in any desired manner, such as, e.g., by algorithms executable by processing circuitry.

The noise sample estimation element 74 also receives indications of the training sequence, the channel impulse response and timing offset, here by way of the lines 54, 66, and 68 respectively. The noise sample estimation operator forms a noise estimate, w(n) of the received sequence. The noise estimate is provided, here by way of the line 84, to the autocorrelation estimation element 76. Autocorrelations are performed by the element 76, and a value of the autocorrelation estimate, r(n) is provided, here represented by way of the line 86, to the filter characteristic selector 78. In one implementation, the autocorrelation is estimated as the absolute value of a sample, r(1).

The filter characteristic selector 78 operates to select the characteristics of an INWF, here the filter element 82. The filter characteristic is selected responsive to comparison of the autocorrelation estimate with a threshold value, here provided by way of the line 88. The filter characteristic that is selected is dependent upon a determination of whether the autocorrelation estimate is greater than, or not greater than, the threshold value.

If the autocorrelation estimate is less than the threshold value, indicative of low levels of interference in the receive sequence, then the filter characteristic selector selects the filter characteristics such that whitening noise is not added, i.e., b=1. If, conversely, the autocorrelation estimate is greater than the threshold, then the filter characteristic selection made by the selector is for the filter element to be operable to inject white noise into the received sequence. That is to say, b=[1; a]. The value of b is provided here by way of the line 92, to the filter element 82, and the filter is operated in a manner in accordance therewith. The filter element is also coupled to receive the receive sequence on the line 42 form an output sequence on the line 94, together with a channel impulse response (CIR) estimate on the line 96.

Mathematical representations of the elements 74-82 of the INWF are as follows. After the channel response is estimated over the training sequence, the noise samples can be estimated by subtracting the re-modulated training sequence from the received signal, that is, $$w(n) = x(n_0 + n) - \sum_{k=0}^{L-1} h(k)s(L - 1 + n - k). \tag{1}$$

Where w(n) is the noise sample estimation, x(n) is the received sample, h(k) is the channel impulse response (CIR) estimation and s(k) is the known training sequence (TS). $n_0$ is timing offset of the received samples of the TS part. L is length of the CIR. $0 \leq n \leq P-L$ and P is the length of the TS. The noise samples can be whitened by a linear prediction error filter (LPF) whose coefficients are b=[1; a] and a is the solution the normal equation:

$$\Gamma a = -\gamma \tag{2}$$

Where $$\Gamma = \begin{bmatrix} r(0) & r^*(1) & \ldots & r^*(M-1) \\ r(1) & r(0) & \ldots & r^*(M-2) \\ \vdots & \vdots & \ddots & \vdots \\ r(M-1) & r(M-2) & \ldots & r(0) \end{bmatrix} \tag{3}$$

$$\gamma[r(1), r(2), \ldots r(M)]^T \tag{4}$$

M is the order of the LPF and r(m) is the estimation of the autocorrelation of the noise samples $$r(m) = \frac{1}{P-L+1} \sum_{k=m}^{P-L} w^*(k-m)w(k). \tag{5}$$

Figure 3:
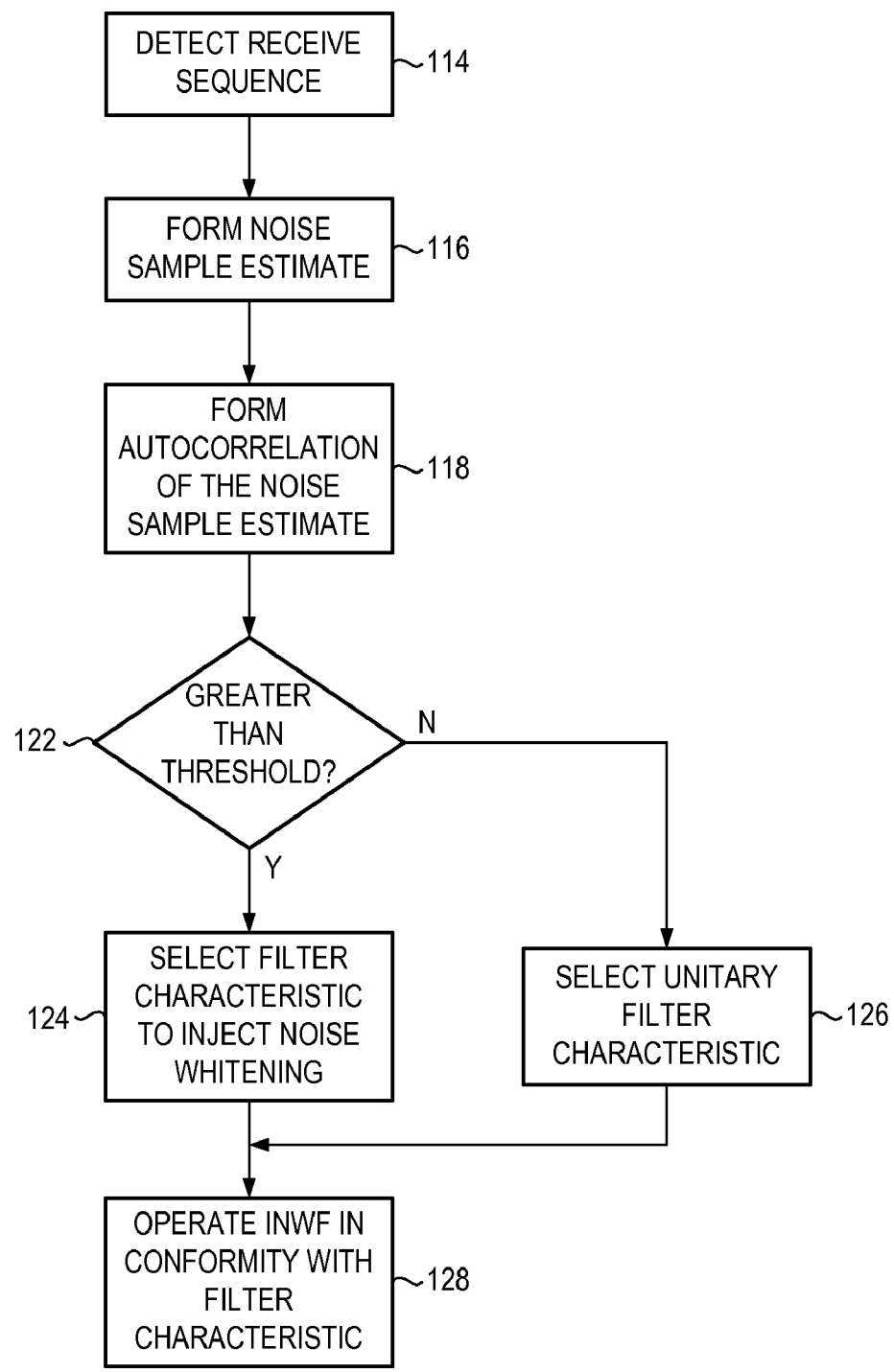
FIG. 3 illustrates a process diagram representing the process of operation of an embodiment of the present invention.

FIG. 3 illustrates a process, shown generally at 112, representative of the process of operation of an embodiment of the present invention. First, and as indicated by the block 114, a receive sequence is detected at a receiving station. Then, and as indicated by the block 116, a noise sample estimate is formed. The noise sample is indicative of the noise component of the received sequence. Then, and as indicated by the block 118, an autocorrelation estimate is formed of the noise sample estimate. A determination is made, indicated by the decision block 122, as to whether the estimated autocorrelation exceeds a threshold. If so, the yes branch is taken to the block 124, and a filter characteristic of an INWF is selected to interject white noise into the receive sequence. If, conversely, the estimated autocorrelation level is less than the threshold, the no branch is taken to the block 126, and the filter characteristic is selected to be of a unitary value, i.e., b=1. Paths are taken from the blocks 124 and 126 to the block 128, and the INWF is caused to be operated in accordance with the selected filter characteristics.

The filter characteristics are selected in a manner best to facilitate recovery of the informational content of the receive sequence. When the receive sequence includes significant interfering components, then the filter is caused to interject white noise. Otherwise, the filter is caused not to be operable, i.e., to exhibit a unitary filter response. The adaptive, input noise whitening filter is used in conjunction with a wideband, pass band receiver filter, best to provide an equalizer with the received sequence components to form equalization operations thereon.

What is claimed is:

1. A receiver having improved interference suppression comprising:
    a first receiver filter; and
    an input noise whitening filter adapted to selectively add whitening to a received signal coupled from said first receiver filter comprising:
        an autocorrelation estimator adapted to accept a noise estimate signal derived from said received signal, calculate a first autocorrelation function from said accepted noise estimate signal, and determine an autocorrelation function from an absolute value of said first autocorrelation function, a filter characteristic selector adapted to receive said autocorrelation estimate, compare said autocorrelation estimate to a threshold value, and select a non-unitary, white noise additive, filter characteristic when said autocorrelation estimate is above said threshold value and select a unitary filter characteristic when said autocorrelation estimate is below said threshold value, and a selectable filter, responsive to said filter characteristic selector to recover an output signal having informational content from said received signal as modified by said selected filter characteristic.

2. The receiver of claim 1 wherein said first receiver filter further includes a wide passband.

3. The receiver of claim 1 wherein said input noise whitening filter further comprises a linear prediction error filter, LPF.

4. The receiver of claim 3 wherein said filter characteristics further comprise LPF filter coefficients.

5. The receiver of claim 4 wherein said LPF filter coefficients are unitary when said autocorrelation estimate is below said threshold value.

6. The receiver of claim 1 wherein said received signal further comprises a received sequence.

7. The receiver of claim 6 wherein said noise estimate signal further comprises said received sequence, a channel impulse response estimation, and a known training response.

8. A method of improving interference suppression in a receiver, comprising:

filtering a received signal; and selectively adding whitening to said filtered received signal by:

deriving a noise estimate signal from said filtered received signal, calculating a first autocorrelation function from said noise estimate signal, determining an autocorrelation function from an absolute value of said first autocorrelation function, comparing said autocorrelation estimate to a threshold value, selecting a non-unitary, white noise additive, filter characteristic when said autocorrelation estimate is above said threshold value and selecting a unitary filter characteristic when said autocorrelation estimate is below said threshold value, and recovering an output signal having informational content from said filtered received signal as modified by a selectable filter employing said selected filter characteristic.

9. The method of claim 8 further comprising filtering said received signal with a wide passband filter.

10. The method of claim 8 wherein said recovering an output signal further comprises modifying said filtered received signal with a linear prediction error filter, LPF.

11. The method of claim 8 wherein said filter characteristics further comprise LPF filter coefficients.

12. The method of claim 11 further comprises setting said LPF filter coefficients to unitary values when said autocorrelation estimate is below said threshold value.

13. The method of claim 8 wherein said filtering a received signal further comprises filtering a received sequence.

14. The method of claim 8 further comprises calculating said noise estimate signal further from said received sequence, a channel impulse response estimation, and a known training sequence response.

15. The method of claim 14 wherein said channel impulse response estimator is estimated over a known training sequence.

16. The method of claim 15 wherein said noise estimate signal is estimated by subtracting a remodulated training sequence from said filtered received signal.

* * * * *